United States Patent [19]
Oh

[11] Patent Number: 5,813,246
[45] Date of Patent: Sep. 29, 1998

[54] WATER DISPENSER FOR A REFRIGERATOR

[75] Inventor: Gil-Soo Oh, Suwon, Rep. of Korea

[73] Assignee: Samsung Electronics Co., Ltd., Suwon, Rep. of Korea

[21] Appl. No.: 757,545

[22] Filed: Nov. 27, 1996

[30] Foreign Application Priority Data

Dec. 5, 1995 [KR] Rep. of Korea .................. 1995 46769
Dec. 9, 1995 [KR] Rep. of Korea .................. 1995 48134

[51] Int. Cl.⁶ ....................................................... B67D 5/62
[52] U.S. Cl. ......................... 62/391; 62/397; 137/614.04; 122/146.6
[58] Field of Search ............................ 62/389, 391, 397; 137/614.03, 614.04; 222/146.6

[56] References Cited

U.S. PATENT DOCUMENTS

| | | | |
|---|---|---|---|
| 2,229,850 | 1/1941 | Hoskins | 62/391 |
| 2,512,395 | 6/1950 | Sundberg | 62/391 |
| 4,948,014 | 8/1990 | Rutter et al. | 222/83 |
| 4,991,635 | 2/1991 | Ulm | 141/346 |
| 5,123,441 | 6/1992 | Hogue et al. | 137/381 |
| 5,542,265 | 8/1996 | Rutland | 62/389 |
| 5,546,979 | 8/1996 | Clark et al. | 137/318 |

*Primary Examiner*—William Doerrler
*Attorney, Agent, or Firm*—Burns, Doane, Swecker & Mathis, L.L.P.

[57] ABSTRACT

A refrigerator includes a water dispensing system having a water tank disposed in the refrigerator, and a water dispensing pipe extending from the tank to the door of the refrigerator. The tank is disconnected from the pipe and removable from the refrigerator to be refilled or cleaned. When the tank has been removed, valves on the tank and pipe, respectively, close to prevent water leakage. When the tank is reinstalled, both valves become re-opened. In another aspect of the invention, a case disposed in the refrigerator door is adapted to receive water receptacles which are inserted upside down. Upon insertion, the receptacles become opened to discharge water into a water groove disposed in the case. A pump discharges water from the groove to a dispensing outlet when a switch is actuated.

9 Claims, 8 Drawing Sheets

WATER DISPENSER FOR A REFRIGERATOR

BACKGROUND OF THE INVENTION

1. Field of the Invention

The present invention relates to a water dispenser for a refrigerator.

2. Description of the Prior Art

Figure 1:
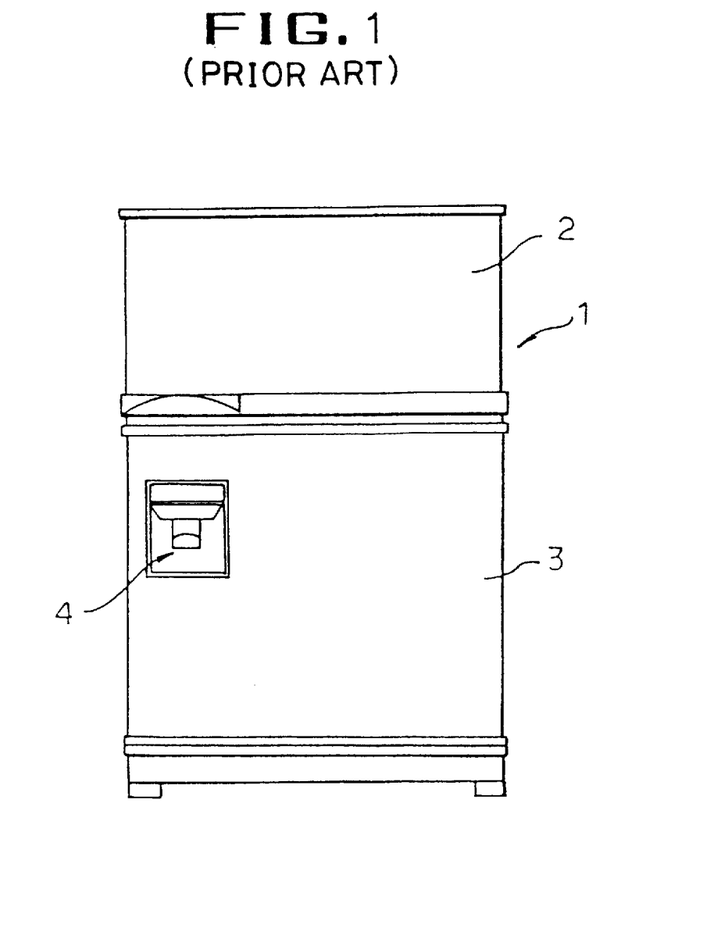
FIG. 1 is a schematic vertical elevation showing a refrigerator having a conventional water dispenser for a refrigerator.

Recently, there has been provided a refrigerator in which cold water can be made available outside the refrigerator without opening the door of the refrigerator. As shown in FIG. 1, a main body 1 of the refrigerator includes at its front portion doors 2 and 3 for closing and opening a freezing compartment and a refrigerating compartment, respectively, wherein the door 3 for the refrigerating compartment is provided at one side thereof with a water dispenser 4.

Figure 2:
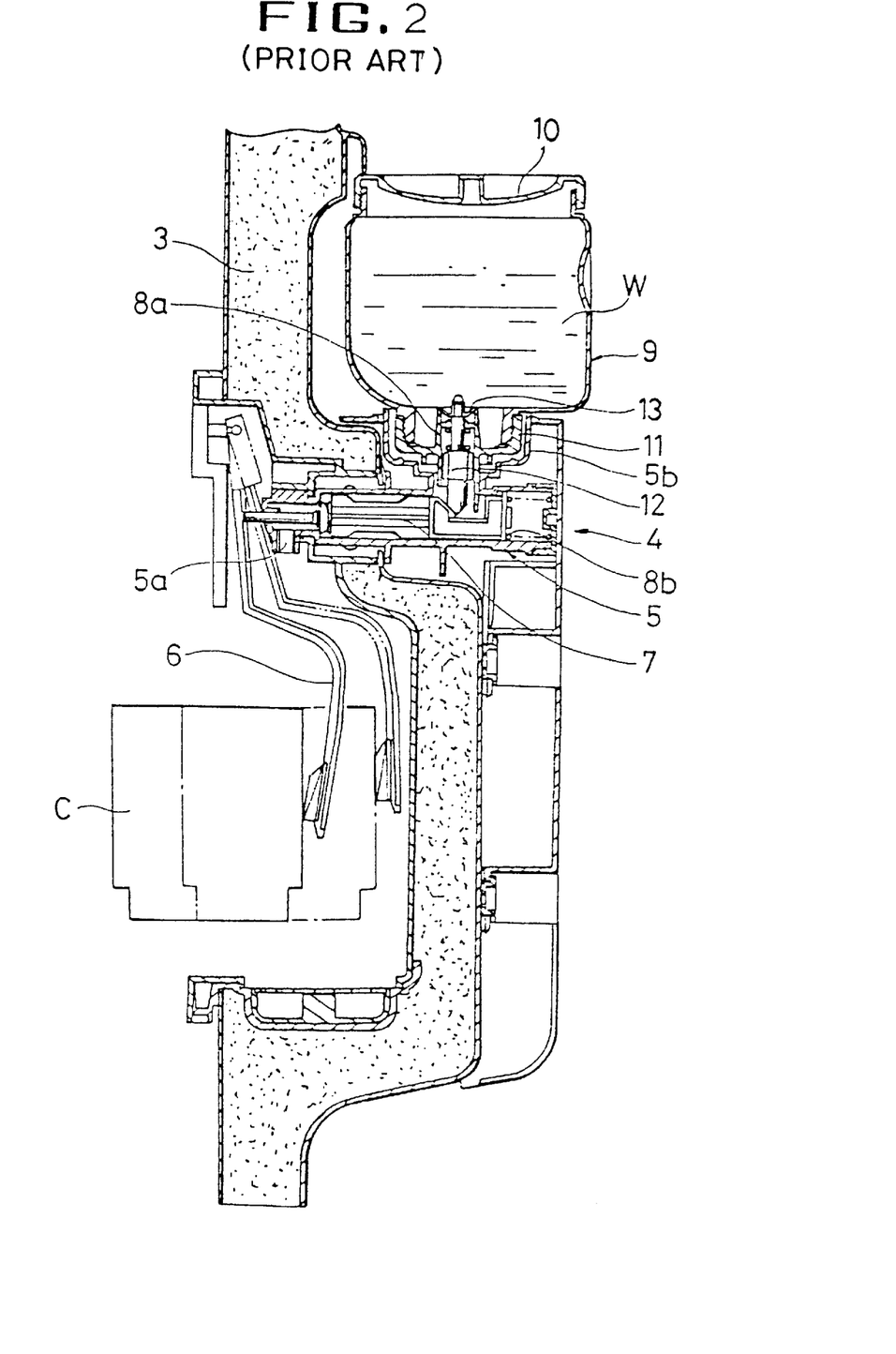
FIG. 2 is a vertical sectional view of a conventional water dispenser for a refrigerator.

The water dispenser 4, as shown in FIG. 2, includes a water discharge outlet 5a for discharging the cold water from the recessed portion of the door 3, a cylinder 5 formed through the door 3, and a receiving portion 5b positioned over the cylinder 5. The cylinder 5 has a slide member 7 therein resiliently biased by means of a spring 8b, in which the slide member 7 is adapted to be horizontally slid in response to movement of a lever 6 hinged at the front portion of the door 3. And, the receiving portion 5b has a reservoir 9 for storing the cold water W positioned thereon.

The reservoir 9 has a cover 10 and a lower cap 11 coupled on upper and lower sides thereof, respectively, and a valve body 12 resiliently biased by means of a spring 8a such that the valve body is able to ascend or descend according to operation of the slide member 7. The valve body 12 has at its upper portion a valve plate 13 coupled thereto for controlling flow of the cold water W by closing and opening the upper portion of the lower cap 11 depending upon the ascending or descending operation of the valve body 12.

Thus, in case the reservoir 9 containing a certain amount of the cold water therein is placed in position within the receiving portion 5b formed on an upper portion of the cylinder 5, the lower part of the valve body 12 coupled to the inner side of the lower cap 11 descends, thereby causing the upper portion of the lower cap 11 to be blocked. Accordingly, the cold water W in the reservoir 9 is no longer discharged.

At this time, pivoting operation of the lever 6 made by the placement of a cup below the water discharge outlet 5a, which is illustrated by two-dotted line in the drawing, causes the slide member 7 to withdraw backward, resulting in the ascending of the valve body 12. Accordingly, the ascending of the valve plate 13 coupled to the upper portion of the valve body 12 opens the upper portion of the lower cap 11 so that the cold water W can be discharged into the cup C by way of the lower cap 11, cylinder 5 and the water discharge outlet 5a.

However, there is a problem in that the cold water might not be available, as necessary, from the conventional water filling apparatus due to a lack of means for detecting presence or absence of the cold water in the reservoir. Furthermore, filling the reservoir with water requires that the user open/close the door of the refrigerator, which causes leakage of the cold air in the refrigerator for that filling operation.

Moreover, the conventional water dispenser has another problem in that the continued use of only a single water storage receptacle for supplying water results in the inconvenient and unsanitary use of the water dispenser.

SUMMARY OF THE INVENTION

Therefore, it is an object of the present invention to provide a water dispenser for a refrigerator, which is adapted for preventing leakage of the water even though a water storage and a water feed pipe are uncoupled, with a certain amount of the water(cold water) remaining in the water storage and the water feed pipe.

It is another object of the present invention to provide a water dispenser for a refrigerator by which even a typical water receptacle can be employed without being limited to a specific shape of a receptacle.

The above objects are accomplished by a water dispenser for a refrigerator employing a leakage prevention apparatus wherein the apparatus comprises:

a first valve coupled to one side of a water storage tank and for closing the water storage tank in response to separation of a water feed pipe from the water storage tank; and a second valve coupled to the water feed pipe for opening the water feed pipe and allowing the first valve to open the water storage tank when the water storage tank and the water feed pipe are coupled together, and for closing the water feed pipe when the water storage tank is separated from the water feed pipe.

According to another aspect of the present invention, a water dispenser for the refrigerator comprises:

water feeding means provided at one side of a refrigerating compartment door for supplying and discharging the water, and having a discharge valve at a lower portion of the water feeding means; and operating means disposed in the water feeding means and having a water feeding pump.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

The preferred embodiments according to the present invention will now be described in detail in accordance with the accompanying drawings.

Figure 3:
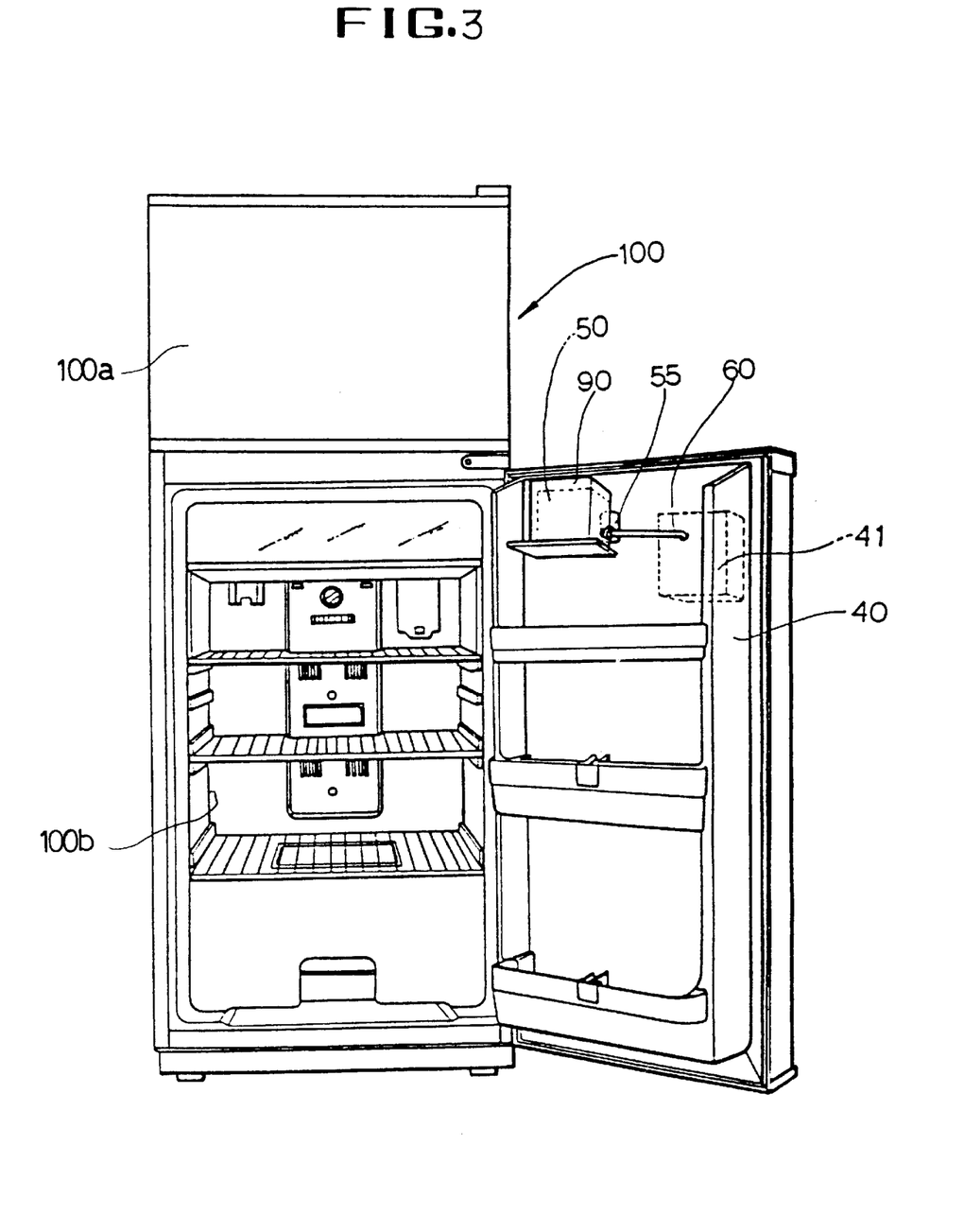
FIG. 3 is a schematic vertical elevation showing a refrigerator having a water dispenser in accordance with one embodiment of the present invention, with a door of the refrigerating compartment opened.

FIG. 3 is a schematic diagram showing a refrigerator having a water dispenser according to one embodiment of the present invention.

In the drawing, reference numeral 100 denotes a main body of the refrigerator, which has a freezing compartment 100a and a refrigerating compartment 100b. The refrigerating compartment 100b has a door 40 for closing and opening and having at its front surface a recessed portion serving as a receptacle receiving portion 41 for receiving a cup. Also, the door 40 has on its rear surface a water storage tank 50 having a water discharge outlet. An inlet end of a water feed pipe 60 is separably coupled to the discharge outlet of the water storage tank 50. The piple 60 includes a water dispensing outlet situated in the receptacle receiving portion 41. The water storage tank 50 is provided at a predetermined position thereof with a pump 55 for supplying water (cold water) to the receptacle receiving portion 41.

Meanwhile, the water dispenser for the refrigerator according to the present invention provides means for preventing a leakage of the water which may occur when the water feed pipe 60 is separated from the water storage tank 50. Now, the leakage prevention means will be described with reference to FIGS. 4(A) and 4(B), and FIG. 5.

Figure 4A:
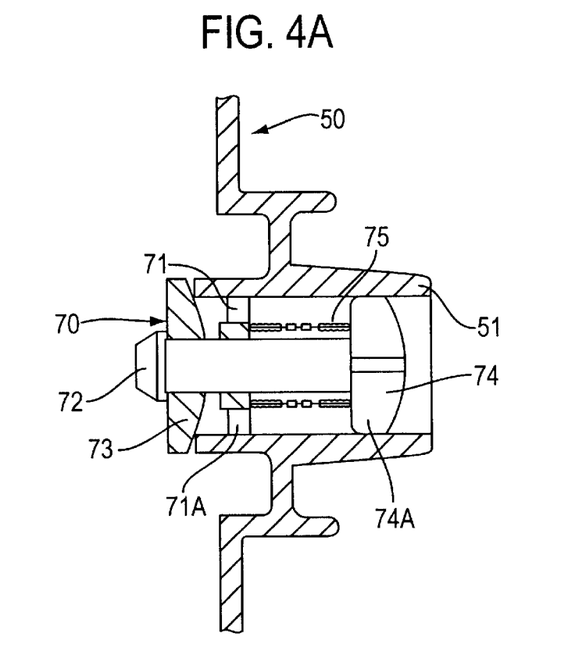
FIG. 4(A) is a sectional view of a first valve of the present invention, which is coupled to a water storage tank.
Figure 4B:
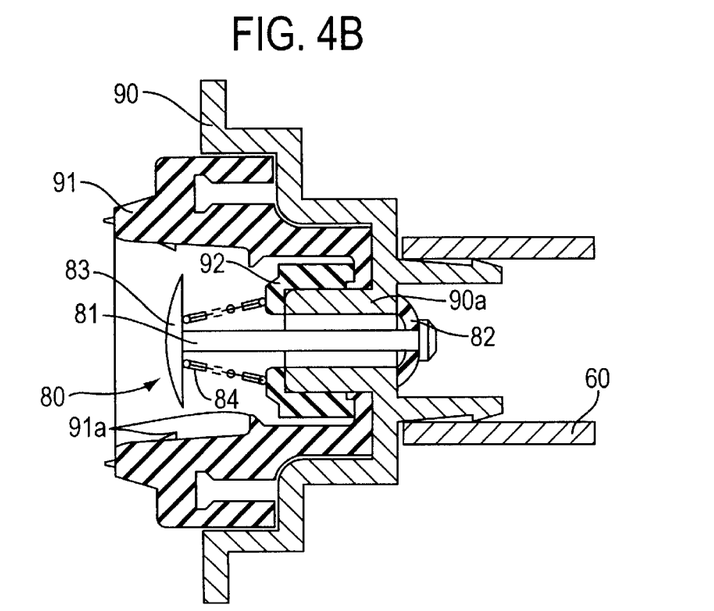
FIG. 4(B) is a sectional view of a second valve of the present invention, which is coupled to a water pipe.

As shown in FIGS. 4(A) and 4(B), the leakage prevention means is composed of a first valve 70 and a second valve 80.

The first valve 70 includes, as shown in FIG. 4(A), a fixing plate 71 fixedly secured at an inner side of a discharge pipe 51 (which defines a discharge outlet of the tank 50), an axial shaft 72 extending through a middle portion of the fixing plate 71, a cap 73 fixed at one end portion of the shaft 72, a supporting plate 74 disposed at the other end portion of the shaft 72, such that an inner surface of the discharge pipe 51 contacts the supporting plate 74, and an elastic member 75 having one end fixed to an inner side of the fixing plate 71 and the other end fixed to the supporting plate 74.

The fixing plate 71 is provided with a plurality of holes 71A serving as fluid passages for discharging the drinkable water (cold water).

The outer side of the supporting plate 74 contacts an inner peripheral surface of the discharge pipe 51 for accurately guiding a straight movement of the shaft 72. The supporting plate 74 also has a plurality of holes 74A similar to those of the fixing plate 71, which serve as fluid passages for discharging the water(cold water).

When the water feed pipe 60 is separated from the water storage tank 50, the shaft 72 is returned to its initial position by the elastic member 75 disposed between the fixing plate 71 and the supporting plate 74.

FIG. 4(B) is a schematic sectional view showing the water feed pipe 60 coupled to a case 90 in which the tank 50 is installed.

The second valve 80 includes a connecting rod 81 adapted to exercise a straight line motion through the hollows formed by both the water feed pipe 60 and a connecting pipe 90a. A cap 82 is coupled to one end portion of the connecting rod 81 for opening or blocking the water feed pipe 60 according to the straight line motion of the connecting rod 81. A pushing member 83 is coupled to the other end of the connecting rod 81 for pushing the supporting plate 74, when the first valve 70 and the second valve 90 are coupled each other, thereby opening the discharge pipe 51 by displacing the cap 72 of the first valve 70(see FIG. 4(A) and FIG. 5). An elastic member 84 has one end thereof connected to the pushing member 83 and the other end connected to a pressing member 92.

The water feed pipe 60 is coupled to the case 90 having at one side thereof the connecting pipe 90a for encompassing the second valve 80 therein. Also, the connecting pipe 90a of the case 90 is provided with a gasket portion 91 serving as a sealing member to prevent the leakage of water when the discharge pipe 51 and the water feed pipe 60 are connected in communication with one another. The gasket 91 portion of the connecting pipe 90a is, as shown in FIG. 4(B), provided with the pressing member 92 such that the gasket portion 91 is not detached from the case 90.

On an inner peripheral surface of the gasket 91 are formed small-sized sealing projections 91a for preventing the leakage of the water (cold water) between the discharge pipe 51 and the gasket 91.

Assuming that the water storage tank 50 and the water feed pipe 60 are not yet coupled to each other, i.e., the discharge pipe 51 is not inserted within the connecting pipe 90a, the present invention will be described below.

When the water supply pipe 60 is separate from the water storage tank 50, the shaft 72 of the first valve 70 attached to the water storage tank 50 is, as shown in FIG. 4(A), at its initial position, i.e., the cap 73 blocks the discharge pipe 51 due to the operation of the elastic member 75. Also, the connecting rod 81 of the second valve 80 attached to the water feed pipe 60 is, as shown in FIG. 4(B), at its initial position, i.e., the cap 82 blocks the connecting pipe 90a due to the operation of the elastic member 84.

Figure 5:
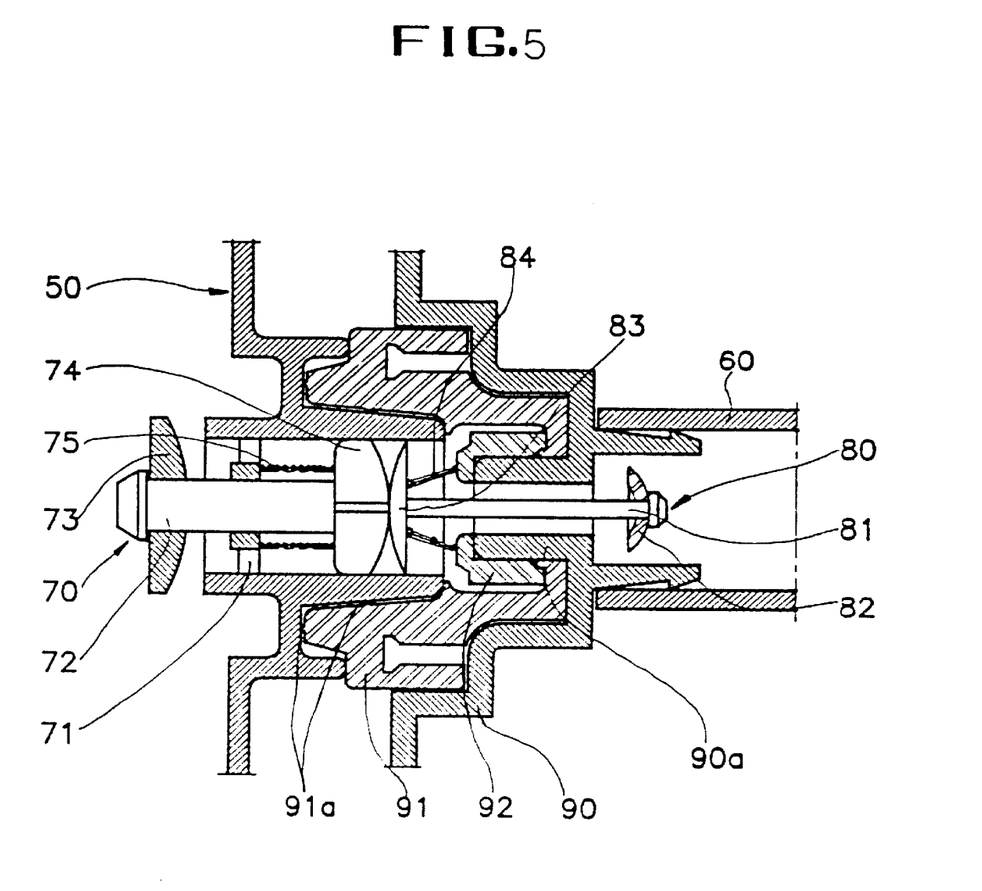
FIG. 5 is a sectional view of the first valve and the second valve coupled to each other.

FIG. 5 shows the water storage tank 50 coupled to the gasket 91. Contact is made between the supporting member 74 and the pressing member 83, thus causing each of the caps 73 and 82 of the first and second valves 70 and 80 to open the water storage tank 50 and the water feed pipe 60, respectively. This is because after initial contact between the supporting member 74 and the pressing member 83 occurs, a continued pushing of the water storage tank towards the water feed pipe 60 moves the shaft 72 in the left direction and the connecting rod 81 in the right direction as seen in FIG. 5. Thus, the water storage tank 50 communicates with the water feed pipe 60, and the water can be thus supplied by the driving of the pump 33.

Thereafter, if the water storage tank 50 and the water feed pipe 60 are uncoupled from each other, e.g., for cleaning them or filling the water storage tank 50, the shaft 72 and the connecting rod 81 are respectively moved to their initial positions by the respective elastic members 75 and 84 of the first and second valves 70 and 80. At this time, it should be noted that no water leaks because the caps 73, 82 of the first and second valves 70 and 80 block the discharge pipe 51 and the water feed pipe 60.

As described above, the water dispenser for the refrigerator according to the preferred embodiment of the present invention has advantages in that even when the water storage tank 50 and the water feed pipe 60 are uncoupled, with a certain amount of the water still contained in the water storage tank 50 and the water feed pipe 60, no water leaks from the water storage and the water feed pipe 60, so that the water (cold water) can be saved and sanitary conditions can be maintained.

Figure 6:
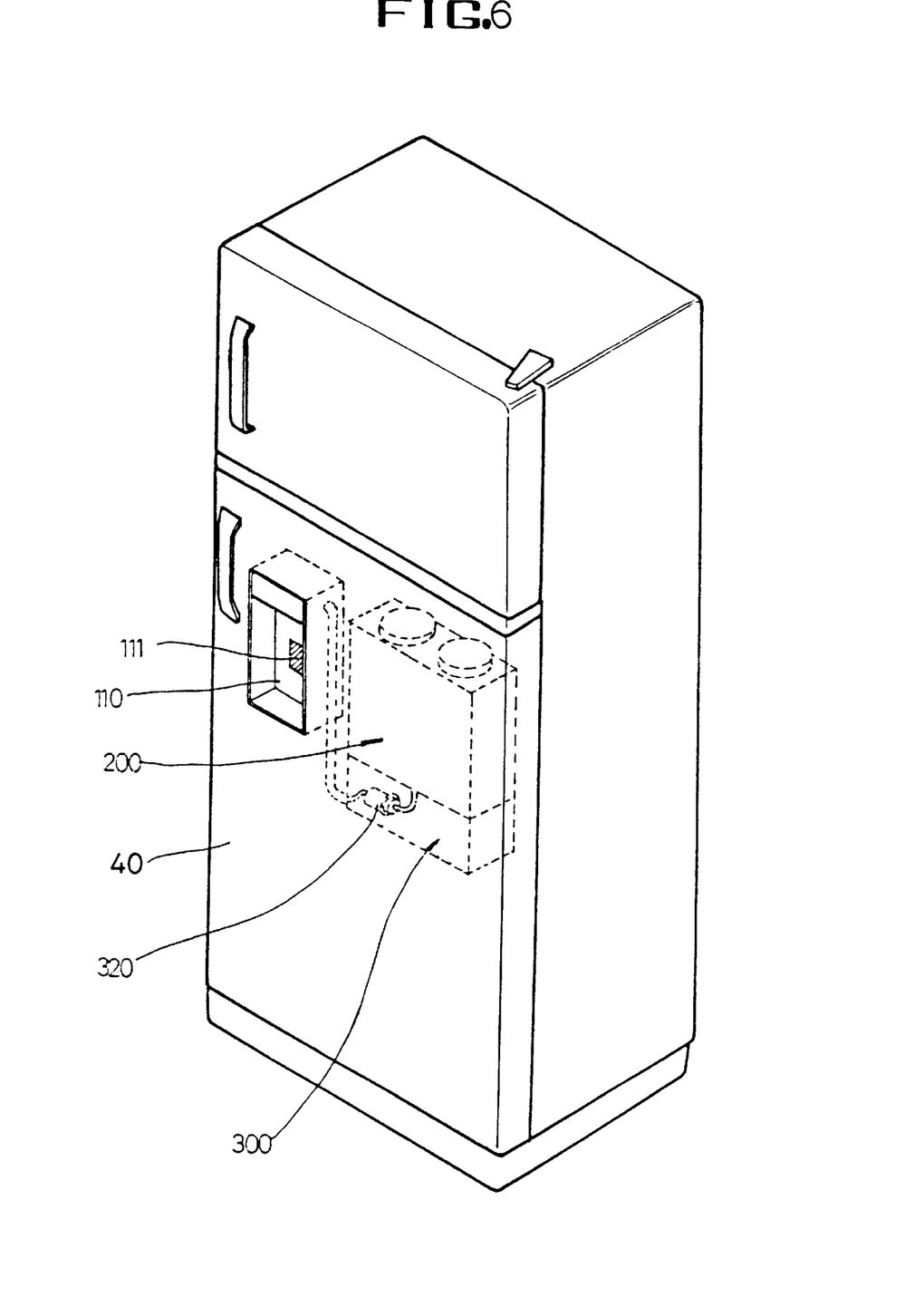
FIG. 6 is a schematic perspective view showing a refrigerator having a water dispenser in accordance with a second embodiment of the present invention.

Meanwhile, FIG. 6 is a perspective view showing the water dispenser for the refrigerator according to a second embodiment of the present invention.

The water dispenser for the refrigerator according to a second embodiment of the present invention includes water feeding means 200 for supplying the water (cold water) to an inner side of the refrigerating compartment door 40, and operating means 300 including a water feeding pump 320 disposed at a lower side of the water feeding means 200. And, the operating means 300 is controlled through a switch 111 installed at one side of the water feeding chamber 110.

Figure 7A:
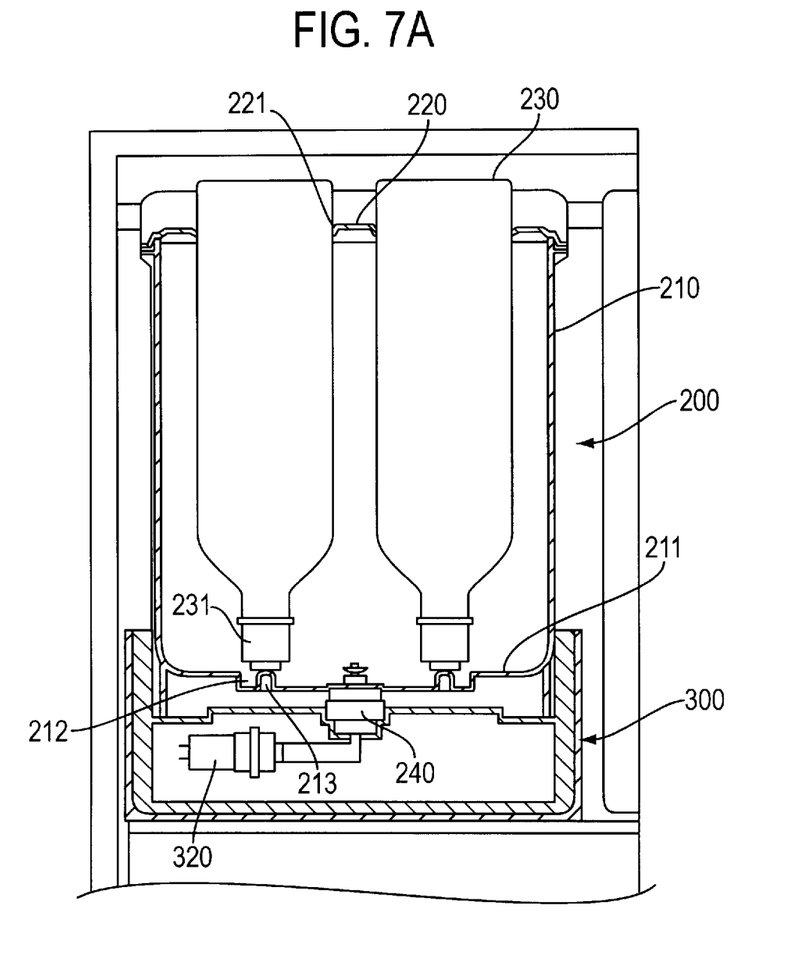
FIG. 7(A) is a vertical sectional view of a water dispenser for a refrigerator in accordance with the second embodiment of the present invention.
Figure 7B:
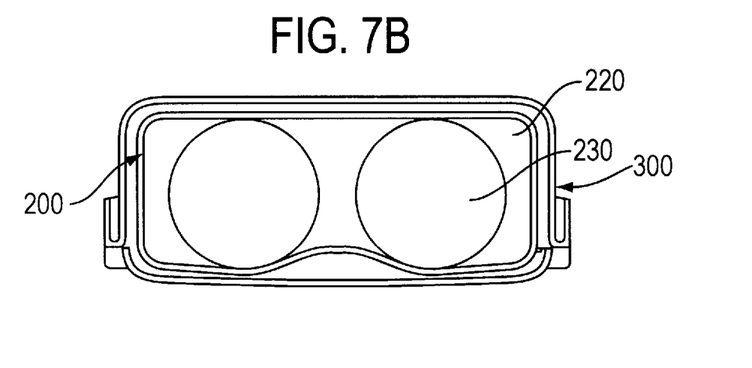
FIG. 7(B) is a top view of FIG. 7(A)

FIGS. 7(A) and (B) are an exploded sectional view and top view, respectively, of the second embodiment of the present invention.

In FIG. 7(A), reference numeral 200 denotes water feeding means. The water feeding means 200 includes a guide case 210, a plurality of water receptacles 230 in the guide case 210, and a water feed valve 232 (see FIG. 8) at an outlet side of the water receptacle 230.

As shown in FIGS. 7(A) and (B), the guide case 210 includes a cover 220 coupled at an upper side of the guide case 210 and having holes 221 for inserting the water receptacles 230, and a water level adjusting groove 212 of a slightly recessed shape at a lower side of the guide case 210. Also, a cap 231 having a water feed valve 232 at one end thereof is coupled to the outlet side of each water receptacle 230, as shown in FIG. 8.

Figure 8:
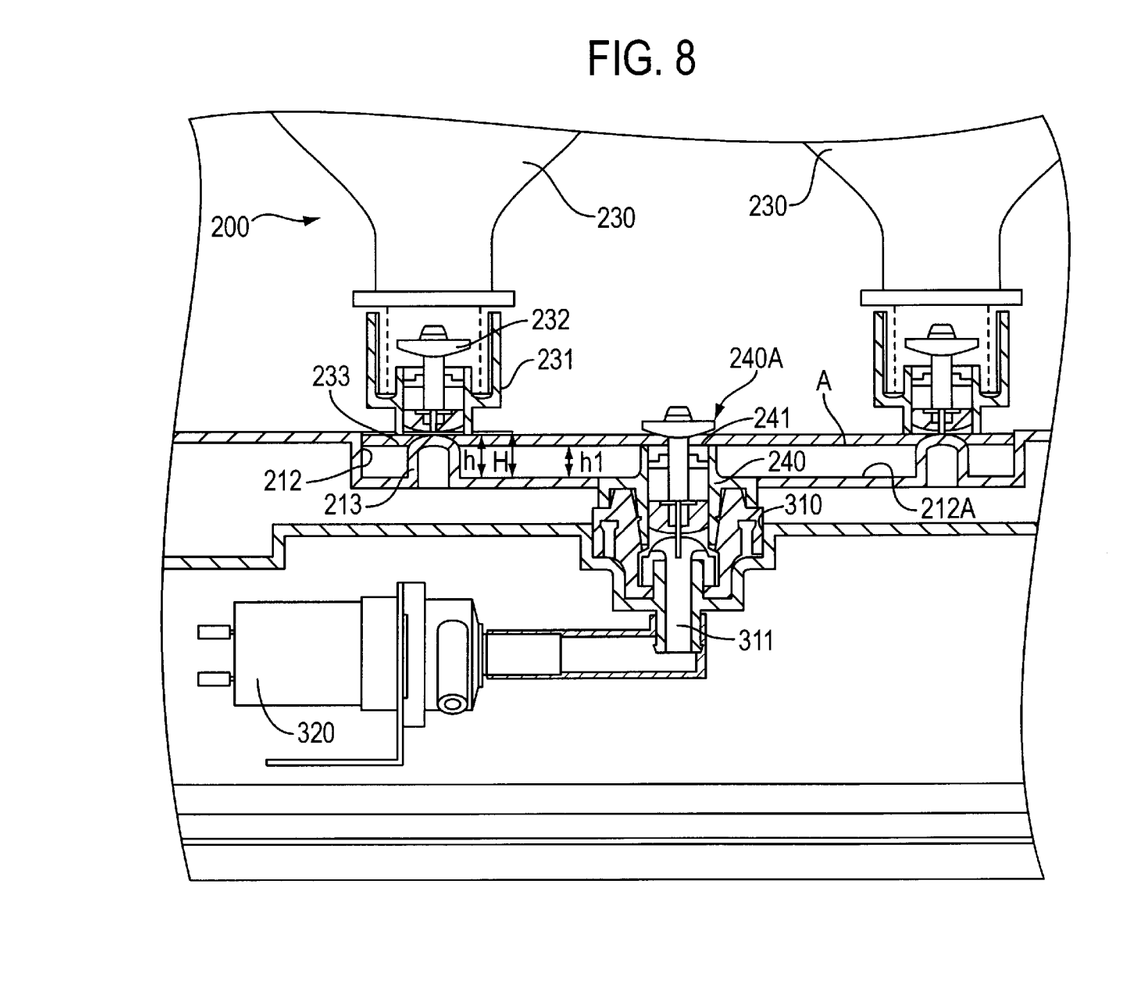
FIG. 8 is an enlarged, fragmentary view of FIG. 7(A).

The water level adjusting groove 212 has projections 213 therein adapted to open the water feed valves 232 of respective water storage receptacles 230, and a discharge tube 240 for discharging the water (cold water) from the water storage receptacle 230, as shown in FIG. 7(A) and FIG. 8. The number of the water level adjusting grooves 212 may be increased or decreased, depending upon the number of the water receptacles 230 to be used.

The discharge tube 240 is seated in place within an insertion groove 310 formed at an upper portion of the operating means 300 and has a discharge outlet 311 arranged to be opened when the discharge tube 240 is seated. That is, a valve 240A disposed in the tube 240 is automatically opened when the tube 240 is seated, as shown in FIG. 8.

FIG. 8 is a sectional view of the water dispenser for the refrigerator according to the second embodiment of the present invention, when using the water dispenser. Referring to FIG. 8, the water dispenser discharges water (cold water) from the water storage receptacles 230 into the discharge tube 240 of the guide case 210 by means of the water feeding pump 320.

If the cap 231 is coupled to the outlet side of the water storage receptacle 230, and then the water storage receptacle 230 is inserted in an inverted state through the hole in the cover 220 of the guide case 210, the cap 231 faces the top surface of a projection 213 formed on the bottom surface of the water level adjusting groove 212. Accordingly, the water feed valve 232 of the cap 231 receives the pressure due to the weight of the water storage receptacle 230, and thus the water feed valve 232 is opened.

Meanwhile, it should be noted that the entrance or top end 241 of the discharge tube 240 which upwardly projected through the water level adjusting groove 212 of the guide case 210, must be always located lower than the lower edge 233 of the cap 231. The depth H of the water level adjusting groove 212 is equal to or greater than a depth h extending from a floor 212A of the groove to the lower edge 233 of the cap 231. A depth h1 extends from the floor 212A to the top end 241 of the tube 240. The depth H of the water level adjusting groove should meet the following relationship:

$$H \geq h > h_1$$

Preferably, the depth H of the water level adjusting groove 212 is defined to meet the above relationship so as to minimize the collected amount of the water at the minimum depth.

A volume of the water designated by a rectangle A is defined by a difference between the depth h1 and the depth h. Only that volume A can be discharged to the outside, and the water receptacle 230 can replenish that volume A. Such procedures continue to be repeated, which allows the water to be constantly discharged and replenished.

The respective operations of the water feed valve 232 and the discharge tube 240 are similar to operations of the first and second valves of the foregoing first embodiment of the present invention, of which details are omitted without further explanation.

Since the water dispenser for the refrigerator according to the second embodiment of the present invention is operated to constantly discharge the water with the detecting operation of the switch, the probability of malfunction due to overuse of the water feeding lever can be lowered, and the reliability of the products can be enhanced.

What is claimed is:

1. A water dispenser adapted for use in a refrigerator, comprising:

a water tank adapted to be removably disposed in a refrigerating compartment and including a substantially horizontally facing water discharge outlet;

a water dispensing outlet adapted to be mounted in a refrigerator door;

a water feed pipe including an outlet end connected to the dispensing outlet and a substantially horizontally facing inlet end removably attached to the discharge outlet;

first and second valves mounted in the discharge outlet and inlet end, respectively, for automatically closing in response to the discharge end being disconnected from the inlet end, and for automatically opening in response to the discharge outlet being connected to the inlet end; and first and second springs arranged to bias said first and second valves, respectively, to positions closing the discharge outlet and inlet end, respectively, each of said valves including opposite first and second ends, said first ends of said first and second valves including respective closure caps for closing the discharge outlet and inlet end, respectively, under the bias of the first and second springs, said second ends of said first and second valves including respective pressing members facing one another and arranged for mutual engagement to force the respective closure caps to an open state in response to the discharge outlet being connected to the inlet end.

2. The water dispenser according to claim 1 wherein the water tank includes a discharge pipe defining said discharge outlet, and a fixing plate disposed inside of the discharge pipe; the first valve including a shaft disposed within the discharge pipe and slidably mounted in the fixing plate, said pressing member of said first valve being in sliding contact with an inner surface of the discharge pipe.

3. The water dispenser according to claim 1, further including a flexible gasket disposed between the tank and water feed pipe and around the first and second valves for preventing leakage therefrom when the discharge outlet is connected to the inlet end.

4. The water dispenser according to claim 3, further including a case in which the tank is disposed, the inlet end removably connected to the case, the gasket being attached to the case.

5. The water dispenser according to claim 3 wherein the tank includes a discharge pipe defining the discharge outlet, the gasket including an opening for removably receiving the discharge pipe, the opening including sealing projections for engaging the discharge pipe to prevent water leakage.

6. A refrigerator, comprising:

a body forming a refrigerating compartment;

a door for closing the refrigerating compartment;

a guide case mounted in the door and forming a water groove and an upward projection;

a water receptacle removably mounted in an inverted state in the guide case, the receptacle including an outlet at its lower end, and a valve disposed in the outlet, the valve being in engagement with the projection to open the valve and emit water into the water groove;

a water pump connected to a discharge opening in the water groove for discharging water from the groove; and a switch mounted in the door for actuating the pump.

7. The refrigerator according to claim 6 wherein the guide case includes a discharge tube projecting upwardly within the water groove, the discharge tube defining the discharge opening of the water groove, the water groove defining a first depth, a distance between a bottom of the groove and a lowermost edge of the receptacle outlet defining a second depth, and a distance from a bottom of the groove to a top of the discharge groove to a top of the discharge tube defining a third depth, the first depth being equal to or greater than the second depth, and the second depth being greater than the third depth.

8. The refrigerator according to claim 6 wherein there are a plurality of said projections, and a plurality of said receptacles having valves engaged with respective projections, a cover overlying the guide case and including a plurality of holes in which respective receptacles are inserted.

9. The refrigerator according to claim 6 wherein the receptacle includes a cap defining the receptacle outlet, the valve disposed in the cap.

\* \* \* \* \*